(12) United States Patent
Du

(10) Patent No.: US 11,996,123 B2
(45) Date of Patent: May 28, 2024

(54) METHOD FOR SYNTHESIZING VIDEOS AND ELECTRONIC DEVICE THEREFOR

(71) Applicant: BEIJING DAJIA INTERNET INFORMATION TECHNOLOGY CO., LTD., Beijing (CN)

(72) Inventor: Haoran Du, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/708,550

(22) Filed: Mar. 30, 2022

(65) Prior Publication Data
US 2022/0223181 A1 Jul. 14, 2022

Related U.S. Application Data

(63) Continuation of application No. PCT/CN2020/105181, filed on Jul. 28, 2020.

(30) Foreign Application Priority Data

Sep. 30, 2019 (CN) .......................... 201910947192.X

(51) Int. Cl.
*G11B 27/031* (2006.01)
*G06V 20/50* (2022.01)
*G06V 40/16* (2022.01)

(52) U.S. Cl.
CPC ............ *G11B 27/031* (2013.01); *G06V 20/50* (2022.01); *G06V 40/172* (2022.01)

(58) Field of Classification Search
CPC .................... G11B 27/031; G11B 15/1875; G06V 40/172; G06V 20/50; H04N 5/262; H04N 5/2621; H04N 9/74

USPC ......................................................... 386/280
See application file for complete search history.

(56) References Cited

U.S. PATENT DOCUMENTS

| | | | |
|---|---|---|---|
| 2012/0105572 | A1 | 5/2012 | Sammon |
| 2012/0194734 | A1 | 8/2012 | Mcconville et al. |
| 2012/0242853 | A1 | 9/2012 | Jasinski et al. |
| 2013/0235223 | A1 | 9/2013 | Park et al. |
| 2017/0256288 | A1* | 9/2017 | Ai ........................ G11B 31/006 |

(Continued)

FOREIGN PATENT DOCUMENTS

| | | |
|---|---|---|
| CN | 104053055 A | 9/2014 |
| CN | 104349175 A | 2/2015 |
| CN | 104735468 A | 6/2015 |

(Continued)

OTHER PUBLICATIONS

International search report of PCT application No. PCT/CN2020/105181 dated Nov. 3, 2020.

(Continued)

*Primary Examiner* — Thai Q Tran
*Assistant Examiner* — Nienru Yang
(74) *Attorney, Agent, or Firm* — Knobbe, Martens, Olson & Bear, LLP

(57) ABSTRACT

A method for synthesizing videos includes: capturing one or more target pictures from a browsing interface of a client; acquiring a target template video configured for the one or more target pictures, wherein the target template video includes a video playback effect; and acquiring a picture video by synthesizing the one or more target pictures and the target template video.

18 Claims, 6 Drawing Sheets

(56) References Cited

U.S. PATENT DOCUMENTS

| | | | | |
|---|---|---|---|---|
| 2018/0286097 | A1* | 10/2018 | Wang | G06V 40/174 |
| 2019/0065895 | A1* | 2/2019 | Wang | G06V 40/172 |

FOREIGN PATENT DOCUMENTS

| | | | |
|---|---|---|---|
| CN | 104991765 A | 10/2015 | |
| CN | 105205063 A | 12/2015 | |
| CN | 107515870 A | 12/2017 | |
| CN | 107682650 A | 2/2018 | |
| CN | 107729522 A | 2/2018 | |
| CN | 108416825 A | 8/2018 | |
| CN | 108540849 A | 9/2018 | |
| CN | 108573044 A | 9/2018 | |
| CN | 108845742 A | 11/2018 | |
| CN | 108924647 A | 11/2018 | |
| CN | 108985176 A | 12/2018 | |
| CN | 109063129 A | 12/2018 | |
| CN | 109767447 A | 5/2019 | |
| CN | 109874023 A | 6/2019 | |
| CN | 110677734 A | 1/2020 | |
| IN | 110177219 A | 8/2019 | |
| KR | 100886489 B1 | 3/2009 | |

OTHER PUBLICATIONS

First office action of Chinese application No. 201910947192.X dated Mar. 2, 2021.

Second office action of Chinese application No. 201910947192.X dated Aug. 17, 2021.

Third office action of Chinese application No. 201910947192.X dated Nov. 12, 2021.

Jiang Fengrong, Research & the System Implementation of Video Compositing Algorithm, China Master's Theses Full-text Database (Electronic Journal) Information Technology Series, Feb. 15, 2017.

* cited by examiner

METHOD FOR SYNTHESIZING VIDEOS AND ELECTRONIC DEVICE THEREFOR

CROSS REFERENCES TO RELATED APPLICATIONS

The present disclosure is a continuation application of International Application No. PCT/CN2020/105181, filed on Jul. 28, 2020, which claims priority to Chinese Patent Application No. 201910947192.X, filed on Sep. 30, 2019, the contents of which are incorporated herein by reference in their entireties.

TECHNICAL FIELD

The present disclosure relates to the field of computer technologies, and in particular, relates to a method for synthesizing videos and an electronic device therefor.

BACKGROUND

A picture video, also called a photo video or a photo film, is in essence to convert pictures selected by a user into a file format of video. Playing the picture video is to browse the pictures in a fashion of video playback, which allows the pictures to be dynamic, thereby achieving a more eye-catching dynamic playback effect.

SUMMARY

The present disclosure provides a method for synthesizing videos and an electronic device therefor. The technical solutions of the present disclosure are described as follows.

According to one aspect of embodiments of the present disclosure, a method for synthesizing videos is provided. The method includes: capturing one or more target pictures from a browsing interface of a client; acquiring a target template video configured for the one or more target pictures, wherein the target template video includes a video playback effect; and acquiring a picture video by synthesizing the one or more target pictures and the target template video.

In some embodiments, capturing the one or more target pictures from the browsing interface of the client includes: identifying a type of one or more pictures in the browsing interface; acquiring a first parameter of the type; capturing the one or more pictures corresponding to the type in the case that the first parameter satisfies a first condition; and acquiring the one or more target pictures by processing the captured one or more pictures.

In some embodiments, acquiring the first parameter of the type includes: acquiring first history data, wherein the first history data includes at least one of times of capturing, times of viewing, or times of storing in favorites with respect to the one or more pictures corresponding to the type; and determining the first parameter of the type based on the first history data.

In some embodiments, determining the first parameter of the type based on the first history data includes: acquiring the first parameter of the type by counting the times of capturing, the times of viewing, and the times of storing in favorites in the first history data.

In some embodiments, acquiring the one or more target pictures by processing the captured one or more pictures includes: acquiring the one or more target pictures by beautifying the captured one or more pictures; or, determining, by face recognition on the captured one or more pictures, pictures containing a same face in the captured one or more pictures as the one or more target pictures.

In some embodiments, determining, by face recognition on the captured one or more pictures, the pictures containing a same face in the captured one or more pictures as the one or more target pictures includes: determining, by face recognition on the captured one or more pictures, pictures containing the same face and satisfying a second condition as the one or more target pictures.

In some embodiments, capturing the one or more target pictures from the browsing interface of the client includes: identifying a type of one or more pictures in the browsing interface; acquiring a first parameter of the type; and acquiring the one or more target pictures by capturing the one or more pictures corresponding to the type in the case that the first parameter satisfies a first condition.

In some embodiments, acquiring the target template video configured for the one or more target pictures includes: acquiring a template video library, and a second parameter of each of template videos in the template video library; and determining the target template video based on a template video with the second parameter satisfying a third condition.

In some embodiments, acquiring the second parameter of each of the template videos in the template video library includes: acquiring second history data, wherein the second history data includes at least one of times of selecting, times of complete playback, or times of storing in favorites with respect to each of the template videos; and determining the second parameter of each of the template videos based on the second history data.

In some embodiments, determining the second parameter of each of the template videos based on the second history data includes: acquiring the second parameter of each of the template videos by counting the times of selecting, the times of complete playback, and the times of storing in favorites with respect to each of the template videos in the second history data.

In some embodiments, the template video includes a transition effect parameter, wherein the transition effect parameter is configured to indicate a dynamic effect for picture switching.

In some embodiments, acquiring the picture video by synthesizing the one or more target pictures and the target template video includes: acquiring a plurality of video frames by framing the target template video; and acquiring the picture video by fusing the one or more target pictures into corresponding video frames.

In some embodiments, acquiring the picture video by fusing the one or more target pictures into the corresponding video frames includes: sorting the one or more target pictures based on picture content of the target pictures; and acquiring the picture video by fusing the one or more target pictures into the corresponding video frame in the sort order of the one or more target pictures.

In some embodiments, sorting the one or more target pictures based on the picture content of the one or more target pictures includes: sorting the one or more target pictures in a chronological order in the case that each of the one or more target pictures contains time information therein; or, sorting the one or more target pictures based on an action of the person in the case that each of the one or more target pictures contains the person therein.

In some embodiments, the method further includes: displaying a completion notification for the picture video and a jump button; and jumping to a playback interface of the picture video in response to a trigger operation on the jump button.

According to another aspect of embodiments of the present disclosure, an electronic device for synthesizing videos is provided. The electronic device includes:
- a processor; and
- a memory configured to store at least one instruction executable by the processor;
- wherein the processor, when executing the at least one instruction, is caused to perform:
- capturing one or more target pictures from a browsing interface of a client; acquiring a target template video configured for the one or more target pictures, wherein the target template video includes a video playback effect; and acquiring a picture video by synthesizing the one or more target pictures and the target template video.

In some embodiments, the processor, when executing the at least one instruction, is caused to perform:
- identifying a type of one or more pictures in the browsing interface; acquiring a first parameter of the type; capturing the one or more pictures corresponding to the type in the case that the first parameter satisfies a first condition; and acquiring the one or more target pictures by processing the captured one or more pictures.

In some embodiments, the processor, when executing the at least one instruction, is caused to perform:
- acquiring first history data, wherein the first history data includes at least one of times of capturing, times of viewing, and times of storing in favorites with respect to the one or more pictures corresponding to the type; and determining the first parameter of the type based on the first history data.

In some embodiments, the processor, when executing the at least one instruction, is caused to perform:
- acquiring the first parameter of the type by counting the times of capturing, the times of viewing, and the times of storing in favorites in the first history data.

According to still another aspect of an embodiment of the present disclosure, a non-transitory computer-readable storage medium storing at least one instruction therein is provided. The at least one instruction, when executed by a processor of an electronic device, causes the electronic device to perform:
- capturing one or more target pictures from a browsing interface of a client; acquiring a target template video configured for the one or more target pictures, wherein the target template video includes a video playback effect; and acquiring a picture video by synthesizing the one or more target pictures and the target template video.

DETAILED DESCRIPTION

In related technologies for synthesizing pictures into a video, users are required to manually upload pictures and manually select a template to generate a picture video. As a result, the video synthesis efficiency is low.

In methods for synthesizing videos according to the embodiments of the present disclosure, a picture video is acquired by capturing one or more target pictures, as video materials, from a browsing interface of a client and synthesizing the one or more target pictures and a configured target template video, without the need of manually selecting the target pictures by the user, which achieves intelligence and automation in selecting the target pictures, simplifies a process of synthesizing the picture video, and improves the efficiency of video synthesis. Since the browsing interface of the client is the interface that the user is viewing, content in the browsing interface is more in line with the user's interests, and a target picture captured from the browsing interface is more in line with the user's interests, thereby ensuring that the generated picture video is more in line with the user's requirements, which improves the accuracy of the picture video.

It should be noted that the methods for synthesizing videos according to the embodiments of the present disclosure may be performed by an electronic device. In some embodiments, the electronic device is any type of terminal such as a mobile phone, a tablet computer, and a desktop computer. In some embodiments, the electronic device is a server, which is one server, or a server cluster composed of several servers, or a cloud computing service center.

Figure 1:
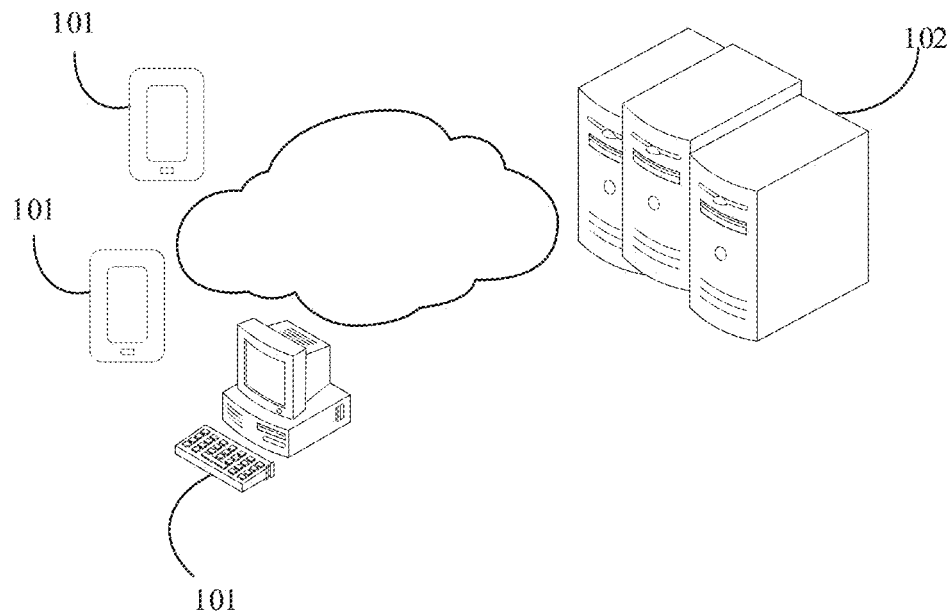
FIG. 1 is a schematic diagram of an implementation environment according to an exemplary embodiment of the present disclosure.

In some embodiments, the electronic device includes a terminal and a server. FIG. 1 is a schematic diagram of an implementation environment according to an exemplary embodiment of the present disclosure. As shown in FIG. 1, the implementation environment includes a terminal 101 and a server 102. The terminal 101 and the server 102 are connected over a network.

In some embodiments, the terminal 101, upon capturing one or more pictures locally, sends the captured one or more pictures to the server 102; the server 102 filters out one or more target pictures from the one or more pictures captured by the terminal, configures a target template video for the one or more target pictures, synthesizes the one or more target pictures with the target template video to acquire a picture video, and sends the picture video to the terminal 101, such that the terminal 101 plays the picture video. The picture video is a video including the one or more target pictures, that is, a video that displays the one or more target pictures by video playback.

Figure 2:
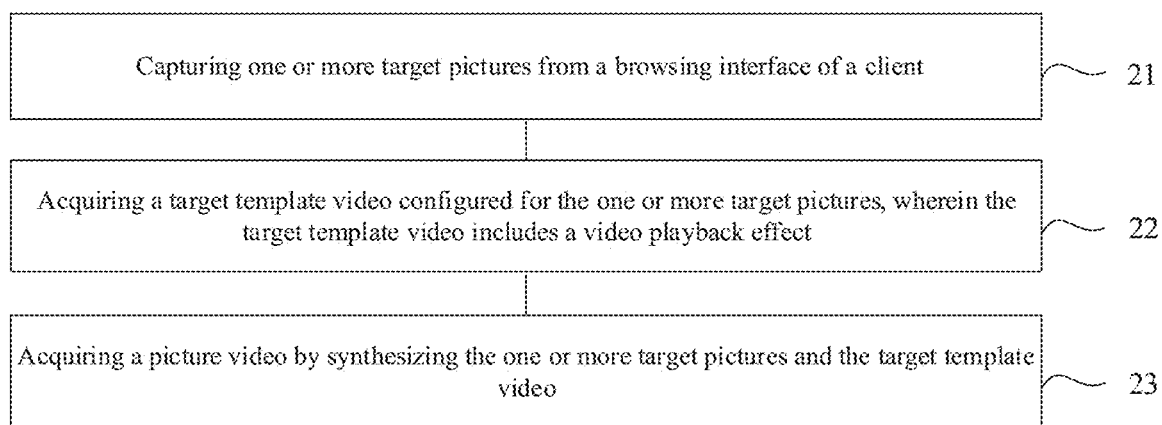
FIG. 2 is a flowchart of a method for synthesizing videos according to an exemplary embodiment of the present disclosure.

FIG. 2 is a flowchart of a method for synthesizing videos according to an exemplary embodiment of the present disclosure. The method is performed by an electronic device. As shown in FIG. 2, the method includes S21, S22 and S23.

In S21, one or more target pictures are captured from a browsing interface of a client.

A user may log in to the client based on a user identifier (ID), and perform operations on the client to allow the client to display the browsing interface. The client may identify the user, currently performing the operations, based on the logged user ID. The browsing interface of the client is the interface that the user browses on the client, and may also be called the browsing interface of the user. Therefore, capturing the one or more pictures from the browsing interface of the client refers to capturing the one or more target pictures from the browsing interface of the user. In some embodiment, capturing one or more pictures from the browsing interface of the client can be achieved by taking one or more screenshots of the browsing interface.

The browsing interface is any interface, for example, a picture display interface, a video display interface, a user generated content (UGC) display interface, or the like, browsed by the user, which is not limited in the embodiments of the present disclosure.

In some embodiments, the browsing interface is an interface that the user is browsing. Where a user is browsing an interface, the user is interested in content displayed in the interface, and by capturing one or more pictures from the browsing interface, one or more target pictures that are in line with the user's interest may be captured.

In some embodiments, the user browses a plurality of interfaces every day. In the case that the one or more target pictures are captured from each interface, a relatively large number of target pictures would be acquired, exerting a greater operating load to the client. Therefore, in the case that a target operation is received in the browsing interface, the one or more target pictures are captured from the browsing interface. The target operation is a like operation, a follow operation, a comment operation, or the like, which is not limited in the embodiments of the present disclosure. Where the user performs the target operation in the browsing interface, the user is interested in the browsing interface. Therefore, by capturing the target picture from the browsing interface, the target picture that is in line with the user's interest may be more accurately captured.

For example, a user C browses an interface A that displays a video B uploaded by a user D; and in the case that the user C prefers content of the video B, the user C may perform a like or comment operation on the video B, and may also perform a follow operation on the user D.

Figure 3:
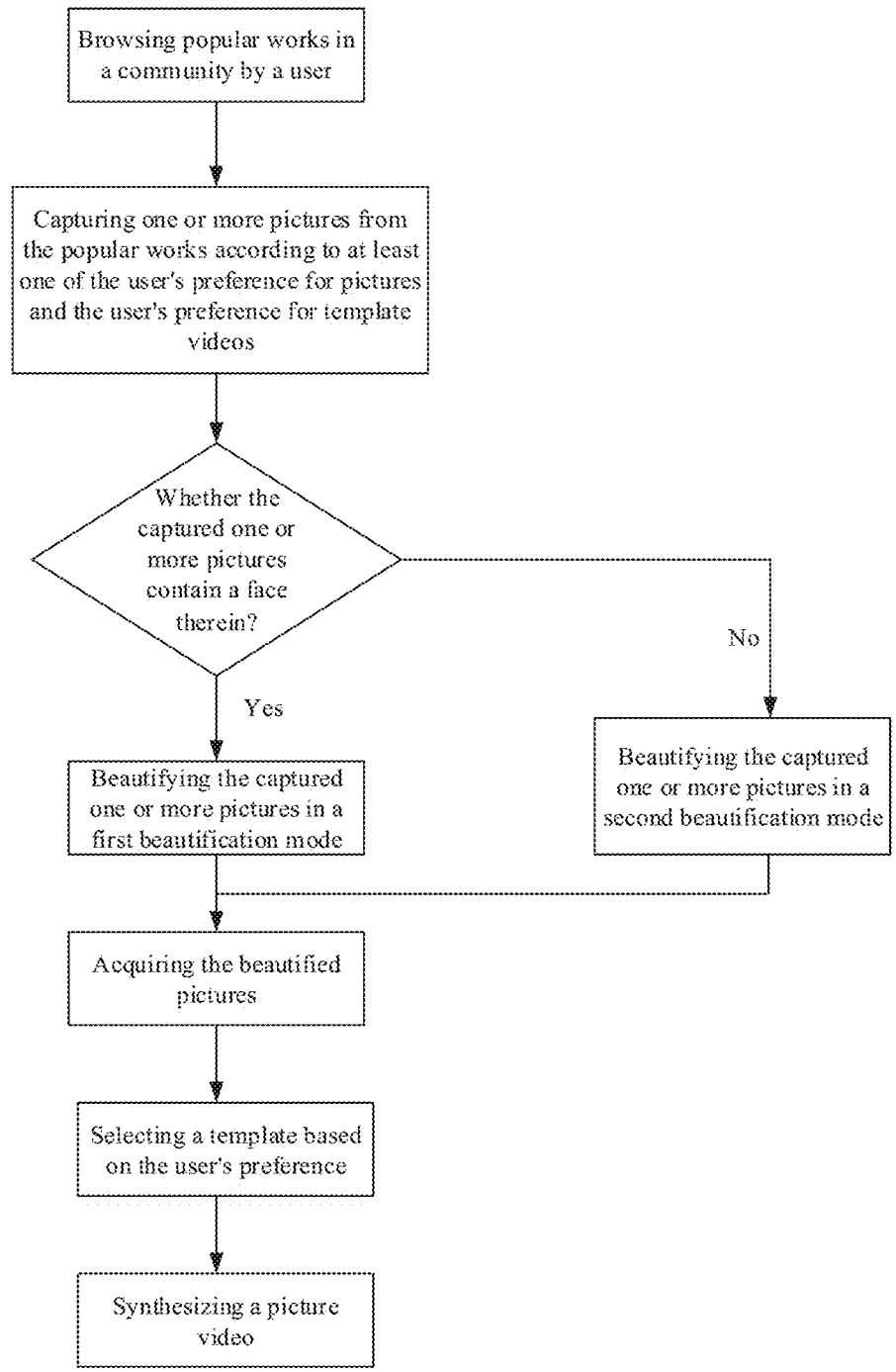
FIG. 3 is a schematic flowchart of performing a method for synthesizing videos in an optional fashion according to an exemplary embodiment of the present disclosure.

In some embodiments, the target picture is a picture displayed in the browsing interface in any fashion. For example, the target picture is a picture on the interface that the user is browsing, or a picture included in a video that the user is viewing on the interface. The fashion of displaying the target picture in the browsing interface is not limited in the embodiments of the present disclosure. For another example, as shown in FIG. 3, when the user browses popular works (such as UGC works) on a community side, the client intelligently captures target pictures from the popular works that the user is browsing, according to at least one of the user's preference for pictures and the user's preference for template videos.

In some embodiments, the target picture is a picture of a target type, wherein the target type is any type, for example, an animation type, a plant type, an animal type, a cute type, or the like. For example, in the case that the target type is a plant type, when an "orchid" picture is displayed in the browsing interface of the user, the client captures the "orchid" picture from the browsing interface as the target picture. The target type is a system default type or a type set by the user.

In some embodiments, the target type is a picture type that the user prefers. That is, the target picture is a picture that the user prefers. The picture that the user prefers is determined by a type, such as person, landscape, animal, or other types, that the user prefers. The type that the user prefers is determined by the user's settings, or determined based on the user's history operation data on various pictures.

In some embodiments, the target type is a picture type matching the template video that the user prefers. Different template videos include different playback effects. Different template videos match different picture types, that is, different template videos are suitable for synthesizing with different types of pictures. The client first captures, according to the picture type corresponding to the template video that the user prefers, one or more target pictures corresponding to the picture type, and then the template video acquired by the client according to the captured one or more target pictures is in line with the user's preference.

In some embodiments, capturing the one or more target pictures from the browsing interface of the client includes: acquiring the target pictures by capturing one or more pictures of the interface during the process of browsing the interface by the user. In some embodiments, the interface includes multimedia data such as videos and pictures, and also includes other types of data. For example, the other types of data includes text data, display data of virtual buttons, and the like, which is not limited in the embodiments of the present disclosure. Therefore, in some embodiments, in the case that a picture is captured on this interface, the client captures complete display content of this interface, or captures multimedia data in this interface.

For example, the interface A includes a title "Product B was released on Apr. 5, 2017," and also includes the text description information and pictures of the product B. Upon capturing a target picture from the interface, the client captures the complete content currently displayed on the interface A. That is, the captured target picture includes: the title, the text description information of the product B, and the picture of the product B. Alternatively, upon capturing the target picture from the interface, the client only captures the multimedia data on the interface. That is, the captured target picture is the picture of the product B.

For another example, the interface A includes a picture B and a virtual button displayed above the picture B. When the target picture is captured from the interface, the client captures a picture on the interface A to acquire a target picture including the picture B and the virtual button above the picture B. Alternatively, the client captures the multimedia data on the interface A to acquire a target picture only including the picture B.

In some embodiments, the electronic device includes a first display layer and a second display layer. The first display layer is directly disposed above the second display layer; and the first display layer displays at least one of a virtual button or text information, whereas the rest area displays no information and is in a transparent state. The second display layer displays multimedia data. Since the rest area of the first display layer is in the transparent state, the multimedia data displayed by the second display layer may be presented by the first display layer. Acquiring the target pictures by the client by capturing the multimedia data in the interface includes: acquiring the target pictures by the client by capturing displayed content of the second display layer of the electronic device.

It should be noted that, in the case that multimedia data and other types of data are displayed on the same display layer of the electronic device, the client may perform picture capturing on a region where the multimedia data is displayed to acquire a target picture.

In S22, a target template video configured for the one or more target pictures is acquired. The target template video includes a video playback effect.

The template video includes a video effect parameter configured to indicate a playback effect of the template video. That is, the video playback effect of the template video is present in the template video in the form of video effect parameter. Different template videos include different playback effects. For example, the playback effect of a template video A is a retro effect, the playback effect of a template video B is an artsy effect, and the playback effect of a template video C is a cute effect. Configuring the template video for the target pictures refers to selecting a playback effect for the target pictures, and the template video configured for the one or more target pictures is the target template video.

In some embodiments, the video effect parameter is a display parameter for a video frame of the template video. For example, the playback effect of the template video is a cute effect, and the video effect parameter is then a display parameter of a "cat" in the video frame.

In some embodiments, the template video includes a plurality of video frames, wherein at least one of the plurality of video frames includes a picture display region and a special-effect display region; the picture display region in the template video is blank; and the special-effect display region displays the video effect indicated by the video effect parameter. The positions of the picture display region and the special-effect display region in the video frame are not limited in the embodiments of the present disclosure. For example, the special-effect display region is disposed around the picture display region; or the special-effect display region is disposed below the picture display region; or the special-effect display region is disposed above the picture display region, or the like.

The template video and the target picture may be synthesized into a picture video, and a plurality of target pictures are played one by one in the picture video. In order to better show the target pictures to the user, a dynamic effect for picture switching is displayed when the displayed target picture is switched. In some embodiments, the video effect parameter includes a transition effect parameter or the like. The transition effect parameter is configured to indicate the dynamic effect for picture switching.

In some embodiments, the template video includes a plurality of video frames, each of which includes a video effect parameter therein. However, the video effect parameters included in the video frames are not necessarily the same. For example, among a plurality of video frames near a picture-switching time point, the video effect parameter of each of the video frames is different. By playing the plurality of video frames continuously, the template video may present a dynamic effect of picture switching, i.e., a transition effect of the target pictures, based on the changes of the video effect parameters.

In some other embodiments, the template video includes a plurality of picture display video frames and a plurality of transition-effect display video frames. The picture display video frame is configured to display the target picture, and the transition-effect display video frame is configured to display the transition effect.

The client may configure the target template video for the target pictures according to various configuration rules. In some embodiments, the client intelligently selects an appropriate template from a template video library according to the user's preference for template video. The template video that the user prefers is determined by the user's settings, or determined based on the user's history operation data on each template video in the template video library.

The template video library is a database storing a plurality of template videos, and is stored in the client or in a server that provides services for the client. In some embodiments, the template video library is maintained by the server, which may responsibly update the template video library; and the client may access the template video library in the server to acquire the target template video. For example, a user may make a template video and upload it to the server, which may add the template video to the template video library, or which may delete a template video with fewer selections based on the times of selection times with respect to each of the template videos.

In some embodiments, the client configures the target template video for the target picture based on the type of the target picture, and the playback effect of the target template video matches the type of the target picture. For example, in the case that the type of the target picture is an animal, the playback effect of the target template video is a cute effect; and in the case that the type of the target picture is a person, the playback effect of the target template video is a retro effect.

In some embodiments, the client configures the target template video for the one or more target pictures based on the type of the target picture and the user's preference, and the playback effect of the target template video matches the type of the target picture and is in line with the user's preference. In some embodiments, the client configuring the target template video for the one or more target pictures based on the type of the target picture and user's preference includes: filtering out at least one template video, that matches the type, from the template video library based on the type of the target picture, and selecting a template video, that the user prefers, from the at least one template video based on the user's preference as the target template video.

For example, in the case that the type of the one or more target pictures is a person, two template videos are filtered out based on the type of the target picture, with one template video having a retro playback effect, and the other template video having an artsy playback effect. In the case that the times the user selects the retro template video is 5, and the times the user selects the artsy template video is 2, the client selects the retro template video as the target template video.

In S23, a picture video is acquired by synthesizing the one or more target pictures and the target template video.

In some embodiments, the client first acquires a plurality of video frames by framing the target template video; and acquires the picture video by inserting the one or more target pictures into corresponding video frames. In some embodiments, each of the video frames includes a picture display region, and inserting the one or more target pictures into the corresponding video frames refers to: displaying the display contents of the one or more target pictures on the picture display regions in the video frames, i.e., fusing the one or more target pictures into the corresponding video frames.

In some embodiments, the target template video may be framed based on a frame length and a frame shift, for example, with the frame length of 25 ms and the frame shift of 10 ms. The values of the frame length and frame shift are set according to actual application requirements.

The plurality of video frames acquired by framing are each correspondingly provided with a start time stamp and an end time stamp, and the time between the start time stamp and the end time stamp is a playback time of a target picture. That is, the playback time of the corresponding target picture may be determined based on the start time stamp and the end time stamp. The playback time is the difference between the start time stamp and the end time stamp. The positions of the start time stamp and the end time stamp correspond to the switching time points of the target picture. That is, the position of the start time stamp of any target picture corresponds to a switching time point at which the picture video is switched to said any target picture from another target picture; and the position of the end time stamp of any target picture corresponds to a switching time point at which the target video is switched from said any target picture to a next target picture.

In practice, the number of video frames is greater than or equal to the number of target pictures. In the case that the number of video frames is greater than the number of target pictures, for example, the number of video frames is 15 and the number of target pictures is 10, any continuous 10 video frames are selected from the 15 video frames, and the 10 target pictures are superimposed with the 10 selected video frames. For example, the 10 target pictures are superimposed with the first 10 video frames, or the 10 target pictures are superimposed with the latter 10 video frames.

In addition, the one or more target pictures are inserted into the video frames in a random order, or in a sequential order in which the one or more target pictures is captured; or, the one or more target pictures are sorted based on the picture content of the one or more target pictures, and the individual target pictures are inserted into the respective video frames in the sorted order of the one or more target pictures, and so on.

In some embodiments, sorting the one or more target pictures based on the picture content of the target pictures includes: sorting the one or more target pictures in a chronological order in the case that each of the target pictures contains time information therein. For example, the client captures five target pictures. The picture content of a target picture A is "a ray of sunlight shining into the room in the morning;" the picture content of a target picture B is "the sun partially rising from the sea;" the picture content of a target picture C is "an empty street under the scorching sun;" the picture content of a target picture D is "stars shining in the night sky;" and the picture content of a target picture E is "two kids playing under the setting sun." Since all the five target pictures contain time information, the five target pictures may be sorted in a chronological order to acquire an order of B, A, C, E, and F, or an order of F, E, C, A, and B.

In some embodiments, sorting the one or more target pictures based on the picture content of the target pictures includes: sorting the one or more target pictures based on an action of the person in the case that each of the target pictures contains a person therein, to achieve continuity in the actions of the person. For example, the client captures four target pictures. The picture content of a target picture A is "a driver driving a motorcycle;" the picture content of a target picture B is "the driver standing on the side of the motorcycle;" the picture content of a target picture C is "the driver standing on the podium;" and the picture content of a target picture D is "the driver driving the motorcycle to cross the finish line." The actions of the driver in the above four target pictures are all different. In order to achieve continuity in the actions of the driver, the target pictures are sorted to acquire an order of B, A, D, and C.

It should be noted that the embodiment of the present disclosure only exemplifies the fashion of sorting the one or more target pictures in the order of the actions of a person and the chronological order, by way of example. In some other embodiments, the client may sort the one or more target pictures by other sorting methods.

In the method for synthesizing videos according to this embodiment, the one or more target pictures are captured as video materials from the browsing interface of the client, and then synthesized with the configured target template video to acquire the picture video, without the need of manually selecting the one or more target pictures by the user, which achieves intelligence and automation in selecting the target pictures, simplifies the process of synthesizing the picture video, and improves the video synthesis efficiency; and since the browsing interface of the client is the interface that the user is viewing, the content in the browsing interface is more in line with the user's interests, and the target pictures captured from the browsing interface are also more in line with the user's interests, thereby ensuring that the generated picture video is more in line with the user's requirements, and increasing the accuracy of the picture video.

Figure 4:
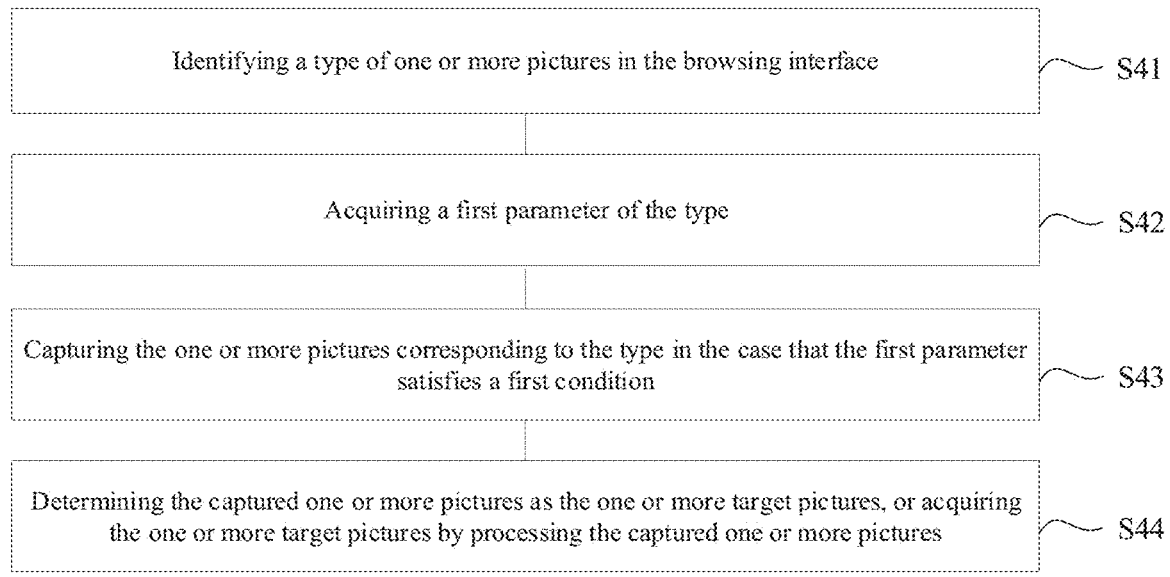
FIG. 4 is a schematic flowchart of capturing target pictures according to an exemplary embodiment of the present disclosure.

In some embodiments, referring to FIG. 3 and FIG. 4, S21 includes:

In S41, a type of one or more pictures in the browsing interface is identified.

In some embodiments, a picture on the interface that the user is browsing is identified, or the type of a picture included in a video that the user is viewing on the interface is identified. The type includes at least one of person, landscape, or animal or the like.

In some embodiments, identifying the type of the picture in the browsing interface includes: identifying a picture on the interface that the user has browsed, or identifying the type of a picture included in a video in the interface that the user has browsed.

In some embodiments, identifying the type of the picture in the browsing interface includes:
classifying the picture in the browsing interface by an image classification model to acquire the type of the picture, wherein the image classification model is any model having an image classification function, for example, a visual geometry group (VGG) model and the like.

In S42, a first parameter of the type is acquired.

The first parameter is configured to indicate the user's preference for the type of picture, and the larger the value of the first parameter, the more the user prefers the type of picture. By acquiring the first parameter of the type, whether the captured picture corresponds to the type that the user prefers can be known.

In some embodiments, the client acquires the first parameter of the type based on history data. In some embodiments, acquiring the first parameter of the type includes: acquiring first history data, wherein the first history data includes at least one of times of capturing, times of viewing, or times of storing in favorites with respect to the one or more pictures corresponding to the type; and determining the first parameter of the type based on the first history data.

The first history data including at least one of the times of capturing, the times of viewing, or the times of storing in favorites with respect to the one or more pictures corresponding to the type refers to: the first history data includes the times of capturing with respect to the one or more pictures corresponding to the type; or the first history data includes the times of viewing with respect to the one or more pictures corresponding to the type; or the first history data includes the times of storing in favorites with respect to the one or more pictures corresponding to the type; or the first history data includes the times of capturing and the times of viewing with respect to the one or more pictures corresponding to the type; or the first history data includes the times of capturing and the times of storing in favorites with respect to the one or more pictures corresponding to the type; or the first history data includes the times of viewing and the times of storing in favorites with respect to the one or more pictures corresponding to the type; or the first history data includes the times of capturing, the times of viewing, and the times of storing in favorites with respect to the one or more pictures corresponding to the type.

The client or the server stores therein history data of the user's operations on the picture, and the history data include at least one of the type of the picture, the times of capturing the picture, the times of viewing the picture, or the times of storing the picture in favorites. For example, in the case that a user A performs a picture capturing operation on a picture B, the client or server adds 1 to the times of capturing the picture B in the history data of the user A, and associates a type C of the picture B with the picture B.

In some embodiments, the client stores the history data of operations of a user on the picture, and for said history data, the history data of a plurality of pictures are classified and stored based on the type of the pictures. Alternatively, the server stores the history data of operations of a plurality of users on the picture; and the history data of the plurality of users are classified and stored based on the users, and the history data of each user is further classified and stored based on the type of picture.

For example, the client currently captures a picture A, the type of the picture A is B. The pictures corresponding to the type B in the history data include a picture C and a picture D. From the history data of the pictures C and D, a first parameter of the type B is acquired, and the first parameter indicates the user's preference degree for the type B.

In some embodiments, in the case that the first history data includes the times of capturing, the times of viewing, or the times of storing in favorites with respect to the one or more pictures corresponding to the type, determining the first parameter of the type based on the first history data includes: acquiring the first parameter of the type by counting the times of capturing, the times of viewing, and the times of storing in favorites in the first history data.

Counting the times of capturing, the times of viewing, and the times of storing in favorites in the first history data includes: taking a sum of the times of capturing, the times of viewing, and the times of storing in favorites as the first parameter of the type; or, acquiring the first parameter of the type by weighting the times of capturing, the times of viewing, and the times of storing in favorites in the first history data.

In some embodiments, different weights are assigned to the times of capturing, the times of viewing, and the times of storing in favorites in the first history data according to the influence on the user's preference degree. For example, the times of storing in favorites has the highest weight, the times of capturing has the second highest weight, and the times of viewing has the smallest weight.

For example, the client first acquires the first history operation data of the user on pictures corresponding to the type, wherein the first history operation data includes times of capturing, times of viewing, and times of storing in favorites with respect to the user for the picture; and then, acquiring the first parameter of the type by performing weighted summation on the first history data. Weight coefficients corresponding to the times of capturing, the times of viewing, the times of storing in favorites and the like may be determined according to actual conditions.

In S43, the one or more pictures corresponding to the type are captured in the case that the first parameter satisfies a first condition.

In some embodiments, capturing the one or more pictures corresponding to the type in the case that the first parameter satisfies the first condition includes: in the case that at least one first parameter exceeds a first threshold, capturing one or more pictures corresponding to the corresponding type for each of the at least one first parameter. Subsequently, the client generates a corresponding picture video based on the target pictures of each type. That is, a plurality of picture videos are generated with respect to a plurality of types of target pictures. The first threshold is any value; the first threshold value is a value set by the user; or the first threshold is a default value set by the system for indicating a boundary of the user's preference degree. For example, in the case that the first parameter is greater than or equal to the first threshold, the first parameter indicates that the user prefers the type corresponding to the first parameter; and in the case that the first parameter is less than the first threshold, the first parameter indicates that the user does not like the type corresponding to the first parameter.

In some embodiments, capturing the pictures corresponding to the type in the case that the first parameter satisfies the first condition includes: in the case that at least one first parameter exceeds the first threshold, acquiring a first target parameter with the largest value from the at least one first parameter, and capturing one or more pictures corresponding to a target type from the browsing interface, wherein the target type is a type corresponding to the first target parameter. Since the acquired target picture is the user's favorite picture, the user's satisfaction with the generated target video is ensured, and the accuracy of the picture video is improved.

In some embodiments, each of the first parameters does not exceed the first threshold, indicating that the browsing interface does not include a target picture that the user prefers. Therefore, in the case that each of the first parameters does not exceed the first threshold, the client does not capture pictures in the browsing interface.

In some embodiments, capturing the pictures corresponding to the type in the case that the first parameter satisfies the first condition includes: sorting a plurality of first parameters in order of magnitude, and by taking a first parameter with the largest value among the plurality of first parameters as a target parameter, capturing one or more pictures corresponding to the target type from the browsing interface, wherein the target type is a type corresponding to the target parameter.

For example, the client sorts the first parameters by magnitude to acquire a type recommendation list, takes a type with the largest first parameter as the target type, and then captures a picture corresponding to the target type from the browsing interface. In practice, the magnitude of the first threshold may be determined according to the actual situation, which is not limited in the embodiments of the present disclosure.

In S44, the captured one or more pictures are determined as the one or more target pictures, or the one or more target pictures are acquired by processing the captured one or more pictures.

In some embodiments, the client directly takes the captured one or more pictures as the one or more target pictures. For example, the client acquires the one or more target pictures by capturing the one or more pictures corresponding to the type from the browsing interface. In some embodiments, in the case that the one or more pictures corresponding to the type are captured, the client further processes the captured one or more pictures, and takes the processed one or more pictures as the one or more target pictures. That is, the one or more pictures corresponding to the type are captured from the browsing interface, and then processed to acquire the one or more target pictures.

In some embodiments, acquiring the one or more target pictures by processing the captured one or more pictures includes: acquiring the one or more target pictures by beautifying the captured one or more pictures; or, determining, by face recognition on the captured one or more pictures, pictures containing a same face in the captured one or more pictures as the one or more target pictures; or, determining, by face recognition on the captured one or more pictures, pictures containing the same face and satisfying a second condition as the one or more target pictures.

In some embodiments, different types of pictures are beautified differently, and acquiring the one or more target pictures by beautifying the captured one or more pictures includes: determining a beautification mode corresponding to the one or more pictures based on the type of the one or more pictures, and acquiring the one or more target pictures by beautifying the one or more pictures in the beautification mode. Since the client captures the picture by type, the client may determine the type of the picture. For example, upon capturing one or more pictures from the browsing interface by type, the client stores the one or more pictures corresponding to the type.

For example, in the case that the type of the picture is a landscape, the brightness or contrast of the picture is adjusted; in the case that the type of the picture is an animal, the brightness of the picture is adjusted, or a special effect element is added to the picture; and in the case that the type of the picture is a person, the person in the picture is beautified, and so on.

In some embodiments, acquiring the one or more target pictures by beautifying the captured one or more pictures includes: in the case that the one or more pictures contain a face therein, beautifying the one or more pictures in a first beautification mode; and in the case that none of the one or more pictures contains a face therein, beautifying the one or more pictures in a second beautification mode. The first beautification mode and the second beautification mode are preset, for example, manually by the user, or defaulted by the system.

For example, as shown in FIG. 3, in the case that one or more pictures are captured from the popular works, the client determines whether the captured one or more pictures contain a face therein. In the case that the captured one or more pictures contain a face therein, the client may beautify the captured one or more pictures in the first beautification mode to acquire the beautified pictures, and in the case that none of the captured one or more pictures contains a face therein, the client may beautify the captured one or more pictures by the second beautification mode to acquire the beautified pictures.

For example, the first beautification mode is face beautification, including at least one of whitening, face-lifting, or adding lip color; and the second beautification mode is brightness adjustment, or contrast adjustment, and the like.

For example, the client may perform face recognition on the captured picture; in the case that a captured picture includes a face region, beautification such as whitening and face-lifting is performed on the face in the picture; in the case that a captured picture does not include the face region, beautification such as brightness and contrast adjustment is performed on the picture; and the beautified picture is determined as the target picture. The client may also determine the pictures containing the same face as the one or more target pictures based on a face recognition result, or determine the pictures containing the same face and satisfy a target condition as the target pictures. In some embodiments, the target condition includes the same or similar facial expressions, or all the faces in the picture have been beautified, and so on. In practice, the target condition may be determined according to actual requirements, which is not specifically limited in the embodiments of the present disclosure.

In some embodiments, determining, by face recognition on the captured one or more pictures, pictures containing a same face in the captured one or more pictures as the one or more target pictures includes: determining, by face recognition on the captured one or more pictures, the pictures containing the same face and having a number exceeding a second threshold as the target pictures. The second threshold is any value, for example, 5, 10, 15, or the like.

For example, in the case that seven pictures among the captured pictures include the face of a person A, and the second threshold is 5, the seven pictures are determined as the target pictures; and in the case that seven pictures among the captured pictures include the face of the person A, and the second threshold is 10, the client does not determine the seven pictures as the target pictures.

It should be noted that, in some embodiments, when pictures containing the same face and having a number exceeding the second threshold are determined as the target pictures, a plurality of target pictures respectively corresponding to different faces are acquired. For example, the face of the person A corresponds to seven target pictures, and the face of a person B corresponds to 10 pictures. In some embodiments, when a picture video is generated based on the target pictures, different picture videos are generated from target pictures corresponding to different faces. For example, a picture video A is generated from the seven pictures including the face of the person A, and a picture video B is generated from the 10 pictures including the face of the person B.

In the embodiment of the present disclosure, high-quality target pictures can be acquired by beautifying the captured pictures, and the target pictures that meet the requirements can be automatically acquired by face recognition and filtering on the captured pictures, and the quality of picture video can be improved.

It should be noted that, in some embodiments, the client performs S41 to S44 under certain conditions. For example, in the process of displaying the browsing interface, the client captures a plurality of pictures from the browsing interface, and acquires one or more target pictures from the plurality pictures based on the types of the plurality of pictures; or, in the case that the number of browsing interfaces displayed on the client reaches a first number, the target pictures are filtered out from the plurality of pictures based on the types of the plurality of pictures; or, in the case that the number of pictures captured by the client reaches a second number, the one or more target pictures are filtered out from the plurality of pictures based on the types of the plurality of pictures; or in the process of using the client by a user, the client captures pictures from the browsing interface, and in the case that the user closes the browsing interface of the client, the client filters out the one or more target pictures from the plurality of pictures based on the types of the plurality of pictures.

Figure 5:
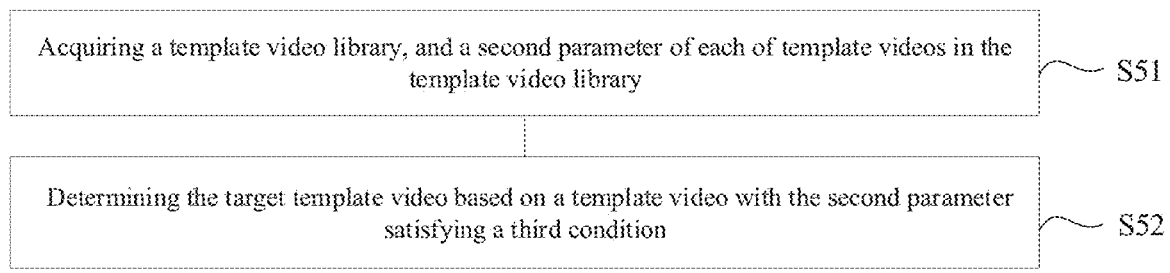
FIG. 5 is a flowchart of acquiring a target template video according to an exemplary embodiment of the present disclosure.

In the embodiment of the present disclosure, referring to FIG. 5, S22 may include the following processes.

In S51, a template video library, and a second parameter of each of template videos in the template video library are acquired.

The second parameter indicates the user's preference degree for a template video. The larger the value of the second parameter, the more the user prefers a template video; and the smaller the value of the second parameter, the less the user prefers a template video. By acquiring the second parameter of the template video, whether the user prefers the template video can be known.

In some embodiments, the client acquires the second parameter of each of the template videos based on the history data, wherein acquiring the second parameter of each of the template videos includes: acquiring second history data, wherein the second history data includes at least one of times of selecting, times of complete playback, or times of storing in favorites with respect to each of the template videos; and determining the second parameter of each of the template videos based on the second history data.

A method for managing the history data of the operations on the template video is similar to the method for managing the history data of the operations on the pictures, and will not be repeated here.

In some embodiments, determining the second parameter of each of the template videos based on the second history data refers to: determining the second parameter of each of the template videos based on at least one of times of selecting, times of complete playback, or times of storing in favorites with respect to each of the template videos in the second history data.

In some embodiments, the times of selecting, the times of complete playback, or the times of storing in favorites with respect to each of the template videos is directly taken as the second parameter. Alternatively, in some embodiments, the second history data includes times of selecting, times of complete playback, and times of storing in favorites with respect to each of the template videos, and determining the second parameter of each of the template videos based on the second history data includes: acquiring the second parameter of each of the template videos by counting the times of selecting, the times of complete playback, and the times of storing in favorites with respect to each of the template videos in the second history data.

For example, the sum of the times of selecting, the times of complete playback, and the times of storing in favorites with respect to a template video A is taken as the second parameter of the template video A; or the second parameter of the template video A is acquired by performing weighted summation on the times of selecting, the times of complete playback, and the times of storing in favorites with respect to the template video A. The weights of the times of selecting, the times of complete playback, and the times of storing in favorites are determined based on the influence on the user's preference degree.

In some embodiments, the client first acquires second history operation data of a user on each of the template videos in the template video library, and the second history operation data includes times of selecting, times of complete playback, and times of storing in favorites with respect to the user for the template video; and the second parameter of each of the template videos is acquired by performing weighted summation on the second history operation data. Weight coefficients corresponding to the times of selecting, the times of complete playback, the times of storing in favorites and the like may be determined according to actual conditions.

In S52, the target template video is determined based on a template video with the second parameter satisfying a third condition.

Since the second parameter indicates whether the user prefers the template video, in the embodiments of the present disclosure, the template video is determined based on the second parameter, that is, the template video is selected according to the user's preference. Subsequently, as shown in FIG. 3, the processed picture and the selected template video are synthesized into a picture video.

In some embodiments, determining the target template video based on the template video with the second parameter satisfying the third condition includes: in the case that a plurality of second parameters are greater than or equal to a third threshold, determining a template video corresponding to the largest second parameter among the plurality of second parameters as a target template video; or, randomly selecting one second parameter from the plurality of second parameters, and determining a template video corresponding to the selected second parameter as the target template video; or, selecting a template video, which is selected by the user last time, from the template videos corresponding to the plurality of second parameters as the target template video. The third threshold is any value, the third value is a default value of the system, or the third value is a value set by a user, which is not limited in the embodiments of the present disclosure.

In some embodiments, determining the target template video based on the template video with the second parameter satisfying the third condition includes: in the case that no template video greater than or equal to the third threshold exists, randomly selecting a template video from the template video library as the target template video; or selecting, based on the type of a target picture, a template video corresponding to the type from the template video library; or taking a template video, which is selected by the user last time, as the target template video.

For example, the second parameters may be sorted by magnitude to acquire a template video recommendation list, and a template video with the largest second parameter is taken as the target template video. The magnitude of the third threshold may be determined according to the actual situation, which is not limited in the embodiments of the present disclosure.

In the method for synthesizing videos according to the embodiment of the present disclosure, the one or more target pictures are captured as video materials from the browsing interface of the client, and then synthesized with the configured target template video to acquire the picture video, without the need of manually selecting the target pictures by the user, which achieves intelligence and automation in selecting the target pictures, simplifies the process of synthesizing the picture video, and improves the video synthesis efficiency; and since the browsing interface of the client is the interface that the user is viewing, the content in the browsing interface is more in line with the user's interests, and the one or more target pictures captured from the browsing interface are also more in line with the user's interests, thereby ensuring that the generated picture video is more in line with the user's requirements, and increasing the accuracy of the picture video.

Based on the type of the pictures, the target pictures are acquired by filtering the captured pictures. Since the type of the pictures is the user's preferred type determined based on the history data, it is ensured that the one or more target pictures selected based on the type are those preferred by the user, such that the accuracy in capturing the target pictures is improved, and the capturing of the target pictures is made more intelligent.

Based on the history data of the template video, the target template video is filtered out from a plurality of template videos in the template video library, and the target template video and the one or more target pictures are synthesized into a picture video. Since the history data is the user's operation data for the template video, the target template video that is in line with the user's preference can be filtered out based on the history data, such that the filtering of the template videos is more intelligent and automated.

It should be noted that, in some embodiments, in the case that the picture video is generated, the client sends a notification message to the user to inform the user that the picture video has been generated, so that the user may view the picture video or perform other processing on the picture video.

In some embodiments, in the case that the picture video is acquired, the client displays a completion notification for the picture video and a jump button; and jumps to a playback interface of the picture video in response to a trigger operation on the jump button.

For example, the completion notification includes a text notification. For example, the text notification is "Your picture video have been synthesized." Alternatively, the completion notification further includes an image notification. For example, the image notification is the first frame or cover frame or the like of the picture video.

The jump button is designed for jumping to a playback interface of the picture video. In some embodiments, the playback interface plays the picture video. That is, in the case that the user triggers the jump button, the client directly plays the picture video. In some other embodiments, the playback interface displays at least one picture video, and in response to a trigger operation on any picture video, the client plays said any picture video. By displaying at least one picture video to the user, the user can more conveniently understand the generated picture video in the case that a plurality of picture videos are generated at the same time or the user does not view a previous picture video.

In some embodiments, the client is further provided with a video sharing button, and in response to a trigger operation on the video sharing button corresponding to any picture video, said any picture video is uploaded to a video sharing platform.

It should be noted that the user may also perform other processing, such as editing and the like, on the picture video, which is not limited in the embodiments of the present disclosure.

All the embodiments of the present disclosure can be executed individually or in combination with other embodiments, all of which shall be construed as falling within the protection scope of the present disclosure.

Figure 6:
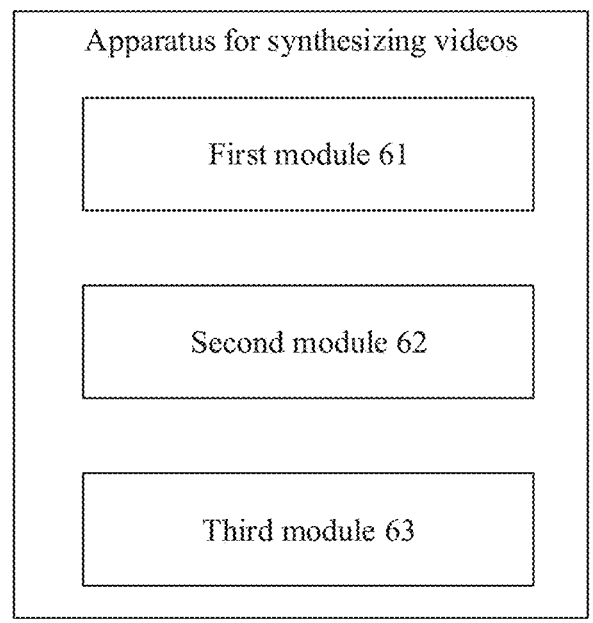
FIG. 6 is a block diagram of an apparatus for synthesizing videos according to an exemplary embodiment of the present disclosure.

FIG. 6 is a block diagram of an apparatus for synthesizing videos according to an exemplary embodiment of the present disclosure. Referring to FIG. 6, the apparatus may include:
a first module 61, configured to capture one or more target pictures from a browsing interface of a client; a second module 62, configured to acquire a target template video configured for the one or more target pictures, wherein the target template video includes a video playback effect; and a third module 63, configured to acquire a picture video by synthesizing the one or more target pictures and the target template video.

In some embodiments, the first module 61 is configured to capture the one or more target pictures from the browsing interface when the client receives a target operation in the browsing interface. The target operation is a like operation, a follow operation, or a comment operation and the like, which is not limited in the embodiments of the present disclosure.

The target picture captured by the first module 61 may be a picture on the interface that the user is browsing, or a picture included in a video that the user is viewing on the interface. For example, when the user browses popular works (such as UGC works) on a community side, the first module 61 (which may be disposed in the client) intelligently captures target pictures from the popular works that the user is browsing, according to the user's preference for pictures.

The picture that the user prefers may be determined by a type, such as person, landscape, animal or other types, that the user prefers. The type that the user prefers may be determined by the user's settings, or determined based on the user's history operation data on various pictures.

In some embodiments, capturing the one or more target pictures from the browsing interface of the client includes: acquiring the one or more target pictures by capturing pictures of the interface during the process of browsing the interface by the user.

In some embodiments, the electronic device includes a first display layer and a second display layer. The first display layer is directly above the second display layer; and the first display layer displays at least one of a virtual button or text information, with the rest area that displays no information and is in a transparent state. The second display layer displays multimedia data. Since the rest area of the first display layer is in the transparent state, the multimedia data displayed by the second display layer may be presented through the first display layer. Acquiring the one or more target pictures by the client by capturing the multimedia data in the interface includes: acquiring the one or more target pictures by the client by capturing a displayed content of the second display layer of the electronic device.

The second module 62 may intelligently select an appropriate template video from a template video library according to the user's preference for template video. The template video that the user prefers may be determined by the user's settings, or determined based on the user's history operation data on each template video in the template video library.

The template video includes a video effect parameter. In some embodiments, the template video includes a plurality of video frames, wherein at least one of the plurality of video frames includes a picture display region and a special-effect display region; the picture display region in the template video is blank; and the special-effect display region displays the video effect corresponding to the video effect parameter.

The video effect parameter may include a transition effect parameter and the like.

In some embodiments, the second module 62 may configure the target template video for the one or more target pictures according to various configuration rules. For example, the client configures the target template video for the one or more target pictures based on the type of the target pictures, and the playback effect of the target template video matches the type of the one or more target pictures. For another example, the client configures the target template video for the one or more target pictures based on the type of the one or more target pictures and the user's preference, and the playback effect of the target template video matches the type of the one or more target pictures and is in line with the user's preference.

In some embodiments, the third module 63 may first acquires a plurality of video frames by framing the target template video; and acquire the picture video by fusing the one or more target pictures into corresponding video frames.

In some embodiments, the one or more target pictures are inserted into the video frames in a random order, or in a sequential order in which the one or more target pictures is captured; or, the one or more target pictures are sorted based on the picture content of the one or more target pictures, and the individual target pictures are inserted into the respective video frames in the sort order of the one or more target pictures, and so on.

In some embodiments, the third module 63 sorts the one or more target pictures in a chronological order in the case that each of the one or more target pictures contains time information therein. Or, the third module 63 sorts the one or more target pictures based on an action of a person in the case that each of the one or more target pictures contains the person therein, so as to achieve continuity in the action of the person.

In some embodiments, the third module 63 may frame the target template video based on a frame length and a frame shift, for example, with the frame length of 25 ms and the frame shift of 10 ms. The values of the frame length and frame shift may be set according to actual application requirements.

Each of the plurality of video frames acquired by framing correspond to a start time stamp and an end time stamp. The time between the start time stamp and the end time stamp corresponds to the playback time of a target picture; and the position of the start time stamp and the position of the end time stamp correspond to the switching time points of the target picture.

In practice, the number of video frames may be greater than or equal to the number of target pictures. In the case that the number of video frames is greater than the number of target pictures, for example, the number of video frames is 15 and the number of target pictures is 10, the 10 target pictures may be superimposed with the first 10 video frames. In addition, the target pictures may be inserted into the video frames in a random order, or in a sequential order in which the target pictures is captured, and so on.

In the apparatus for synthesizing videos according to the embodiments of the present disclosure, the one or more target pictures are captured as video materials from the browsing interface of the client, and then synthesized with the configured target template video to acquire the picture video, without the need of manually selecting the target pictures by the user, which achieves intelligence and automation in selecting the target pictures, simplifies the process of synthesizing the picture video, and improves the video synthesis efficiency; and since the browsing interface of the client is the interface that the user is viewing, the content in the browsing interface is more in line with the user's interests, and the one or more target pictures captured from the browsing interface are also more in line with the user's interests, thereby ensuring that the generated picture video is more in line with the user's requirements, and increasing the accuracy of the picture video.

In some embodiments, the first module 61 includes: an identifying unit, configured to identify a type of one or more pictures in the browsing interface; a first acquiring unit, configured to acquire a first parameter of the type; a capturing unit, configured to capture the one or more pictures corresponding to the type in the case that the first parameter satisfies a first condition; and a first determining unit, configured to acquire the one or more target pictures by processing the captured pictures.

In some embodiments, the first module 61 includes: an identifying unit, configured to identify a type of one or more pictures in the browsing interface; a first acquiring unit, configured to acquire a first parameter of the type; a capturing unit, configured to acquire the one or more target pictures by capturing the one or more pictures corresponding to the type in the case that the first parameter satisfies a first condition.

The first acquiring unit may first acquire first history data, which include at least one of times of capturing, times of viewing, or times of storing in favorites and the like with respect to the user for the picture; and then acquire the first parameter of the type based on the first history data.

In some embodiments, determining the first parameter of the type based on the first history data includes: acquiring the first parameter of the type by counting the times of capturing, the times of viewing, and the times of storing in favorites in the first history data. For example, a sum of the times of capturing, the times of viewing, and the times of storing in favorites is directly taken as the first parameter of the type; or, the first parameter of the type is acquired by weighting the times of capturing, the times of viewing, and the times of storing in favorites in the first history data. Weight coefficients corresponding to the times of capturing, the times of viewing, the times of storing in favorites and the like may be determined according to actual conditions.

In some embodiments, the acquiring unit captures the one or more pictures corresponding to the type in the case that the first parameter satisfies a first condition.

The acquiring unit may also sort the first parameters by magnitude to acquire a type recommendation list, take a type with the largest first parameter as the target type, and then captures one or more pictures corresponding to the target type from the browsing interface.

The first determining unit may directly determine the captured one or more pictures as the one or more target pictures, or acquire the one or more target pictures by processing the captured one or more pictures. The first determining unit is configured to: acquire the one or more target pictures by beautifying the captured one or more pictures; or, determine, by face recognition on the captured one or more pictures, pictures containing the same face as the one or more target pictures.

In some embodiments, the first determining unit is configured to: determine, by face recognition on the captured one or more pictures, pictures containing the same face and satisfying a second condition as the one or more target pictures.

For example, the first determining unit may perform face recognition on the captured one or more pictures; in the case that a captured picture includes a face region, beautification such as whitening and face-lifting is performed on the face in the picture; and in the case that a captured picture does not include the face region, beautification such as brightness and contrast adjustment is performed on the picture; and the beautified picture is determined as the target picture. The first determining unit may further determine the pictures containing the same face as the one or more target pictures based on a face recognition result, or determine the pictures containing the same face and satisfy a second condition as the one or more target pictures. In some embodiments, the second condition includes the same or similar facial expressions, or all the faces in the picture have been beautified, and so on. In practice, the second condition may be determined according to actual requirements, which is not specifically limited in the embodiments of the present disclosure.

In this embodiment, high-quality target pictures can be acquired by beautifying the captured pictures, and the target pictures that meet the requirements can be automatically acquired by face recognition and filtering on the captured pictures, and the quality of picture video can be improved.

In some embodiments, the second module 62 includes: a second acquiring unit, configured to acquire a template video library, and a second parameter of each of template videos in the template video library; and a second determining unit, configured to determine the target template video based on a template video with the second parameter satisfying a third condition.

The second acquiring unit may first acquire second history data, which includes at least one of times of selecting, times of complete playback, or times of storing in favorites with respect to each of the template videos; and determine the second parameter of each of the template videos based on the second history data.

In some embodiments, the second acquiring unit acquires the second parameter of each of the template videos by counting the times of selecting, the times of complete playback, and the times of storing in favorites with respect to each of the template videos in the second history data.

For example, a sum of the times of selecting, the times of complete playback, and the times of storing in favorites is directly taken as the second parameter; or, the second parameter is acquired by weighting the times of selecting, the times of complete playback, and the times of storing in favorites in the second history data. Weight coefficients corresponding to the times of selecting, the times of complete playback, the times of storing in favorites and the like may be determined according to actual conditions.

The second determining unit may acquire a template video recommendation list by sorting the second parameters by magnitude, and a template video with the largest second parameter is taken as the target template video.

In some embodiments, the third module 63 is configured to: sort the one or more target pictures based on a picture content of the one or more target pictures; and acquire the picture video by fusing the one or more target pictures into the corresponding video frame in the sort order of the one or more target pictures.

In some embodiments, the third module 63 is configured to: sort the target pictures in a chronological order in the case that each of the target pictures contains time information therein; or, sort the target pictures based on an action of a person in the case that each of the target pictures includes the person therein.

In some embodiments, the apparatus is configured to: display a completion notification for the picture video and a jump button; and jump to a playback interface of the picture video in response to a trigger operation on the jump button.

In the apparatus for synthesizing videos according to the embodiments of the present disclosure, the one or more target pictures are captured as video materials from the browsing interface of the client, and then synthesized with the configured target template video to acquire the picture video, without the need of manually selecting the target pictures by the user, which achieves intelligence and automation in selecting the target pictures, simplifies the process of synthesizing the picture video, and improves the video synthesis efficiency; and since the browsing interface of the client is the interface that the user is viewing, the content in the browsing interface is more in line with the user's interests, and the one or more target pictures captured from the browsing interface are also more in line with the user's interests, thereby ensuring that the generated picture video is more in line with the user's requirements, and increasing the accuracy of the picture video.

With respect to the apparatus according to the above embodiments, details about performing operations by the modules are given in the embodiments related to the method, which are not given herein any further.

Figure 7:
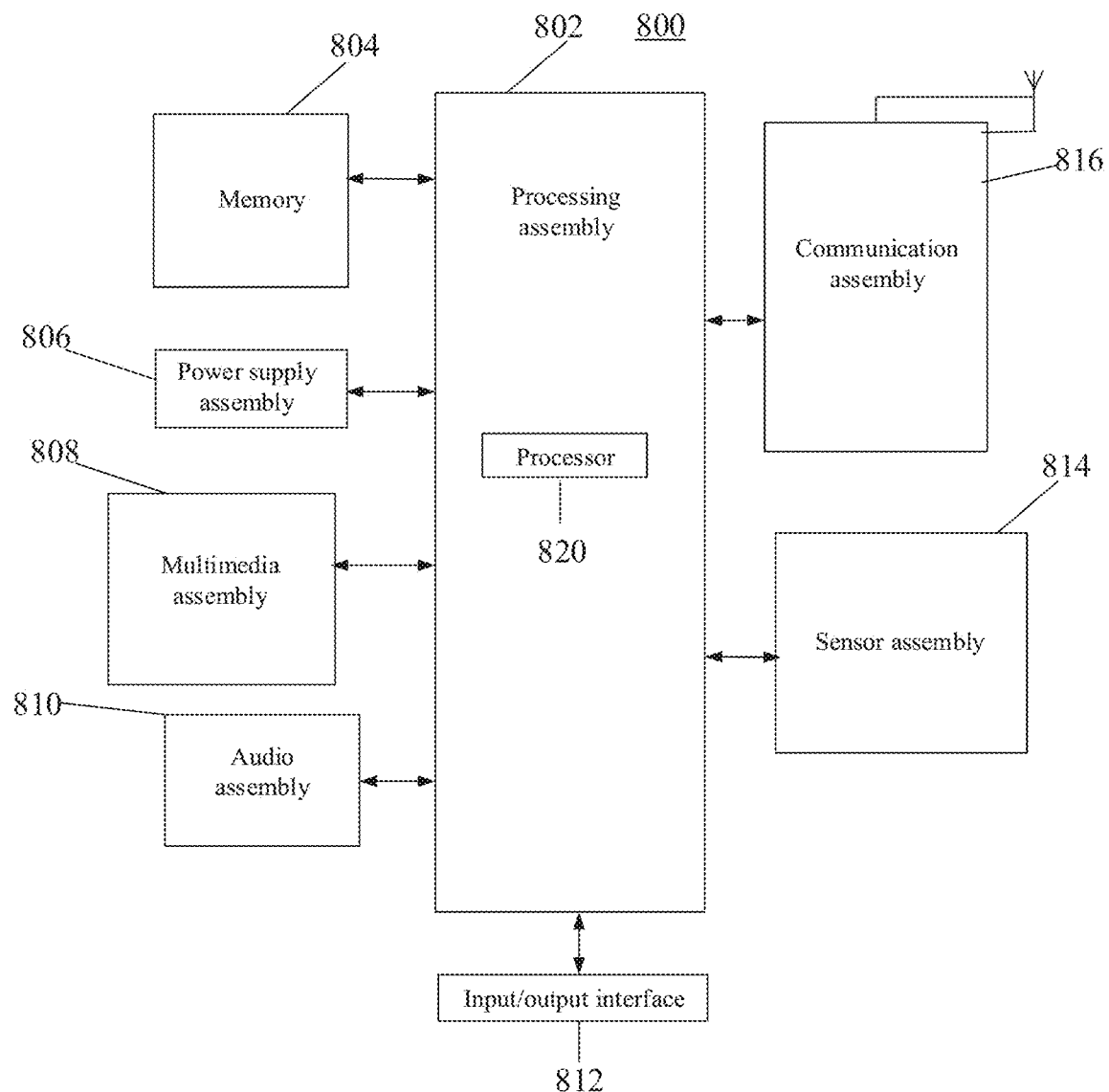
FIG. 7 is a block diagram of an electronic device for synthesizing videos according to an exemplary embodiment of the present disclosure.

FIG. 7 is a block diagram of an electronic device 800 for synthesizing videos according to the present disclosure. For example, the electronic device 800 may be a mobile phone, a computer, a digital broadcast terminal, a message transceiving device, a game console, a tablet device, a medical device, a fitness device, a personal digital assistant, or the like.

Referring to FIG. 7, the electronic device 800 may include one or more of: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls overall operations such as operations associated with display, telephone call, data communication, camera operation, and recording operation of the electronic device 800. The processing assembly 802 may include one or more processors 820 to execute at least one instruction so as to perform the method for synthesizing videos as described in any one of the above embodiments. The method for synthesizing videos includes:

capturing one or more target pictures from a browsing interface of a client;

acquiring a target template video configured for the one or more target pictures, wherein the target template video includes a video effect; and acquiring a picture video by synthesizing the one or more target pictures and the target template video.

Moreover, the processing assembly 802 may include one or more modules which facilitate the interaction between the processing assembly 802 and other assemblies. For instance, the processing assembly 802 may include a multimedia module to facilitate the interaction between the multimedia assembly 808 and the processing assembly 802.

The memory 804 is configured to store various types of data to support the operation on the electronic device 800. Examples of such data include at least one instruction for any application or method operated on the electronic device 800, contact data, phonebook data, messages, pictures, videos, etc. The memory 804 may be implemented by any type of volatile or non-volatile storage devices, or a combination thereof, such as a static random-access memory (SRAM), an erasable programmable read-only memory (EPROM), a programmable read-only memory (PROM), a read-only memory (ROM), a magnetic memory, a flash memory, a magnetic disk, or an optical disk.

The power supply assembly 806 supplies power to various assemblies of the electronic device 800. The power supply assembly 806 may include a power management system, one or more power supplies, and any other assemblies associated with the generation, management, and distribution of power for the electronic device 800.

The multimedia assembly 808 includes a screen providing an output interface between the electronic device 800 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a duration and a force associated with the touch or swipe operation. In some embodiments, the multimedia assembly 808 includes a front camera and/or a rear camera. When the electronic device 800 is in an operation mode, such as a shooting mode or a video mode, the front camera and/or the rear camera may receive external multimedia data. Each of the front camera and the rear camera may be a fixed optical lens system or may have a focal length and an optical zoom capability.

The audio assembly 810 is configured to output and/or input audio signals. For example, the audio assembly 810 includes a microphone (MIC), which is configured to receive external audio signals when the electronic device 800 is in an operation mode, such as a call mode, a recording mode, and a voice recognition mode. The received audio signals may be further stored in the memory 804 or transmitted via the communication assembly 816. In some embodiments, the audio assembly 810 further includes a speaker for outputting the audio signals.

The I/O interface 812 provides an interface between the processing assembly 802 and peripheral interface modules, such as a keyboard, a click wheel and buttons. These buttons may include but are not limited to: a home button, a volume button, a start button, and a lock button.

The sensor assembly 814 includes one or more sensors for providing the electronic device 800 with status evaluations in all aspects. For example, the sensor assembly 814 may detect an on/off state of the electronic device 800, and relative positions of the assemblies. The assemblies include, for example, a display and a keypad of the electronic device 800. The sensor assembly 814 may further detect a change in position of the electronic device 800 or an assembly of the electronic device 800, presence or absence of user contact with the electronic device 800, an orientation or acceleration/deceleration of the electronic device 800, and a change in temperature of the electronic device 800. The sensor assembly 814 may include a proximity sensor configured to detect the presence of a nearby object without any physical contact. The sensor assembly 814 may further include an optical sensor, such as a complementary metal-oxide-semiconductor (CMOS) or charge-coupled device (CCD) image sensor, for use in an imaging application. In some embodiments, the sensor assembly 814 may further include an acceleration sensor, a gyroscope sensor, a magnetic sensor, a force sensor, or a temperature sensor.

The communication assembly 816 is configured to facilitate communication, wired or wireless, between the electronic device 800 and other devices. The electronic device 800 may access a communication standard based wireless network, such as Wi-Fi, an operator network (such as 2G, 3G, 4G, or 5G), or a combination thereof. In an exemplary embodiment, the communication assembly 816 receives broadcast signals or broadcast associated information from an external broadcast management system via a broadcast channel. In an exemplary embodiment, the communication assembly 816 further includes a near-field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the electronic device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the method for synthesizing videos according to any one of the above embodiments.

In some embodiments, an electronic device for synthesizing videos is provided. The electronic device includes: a processor, and a memory configured to store at least one instruction executable by the processor.

The processor, when executing the at least one instruction, is caused to perform: capturing one or more target pictures from a browsing interface of a client; acquiring a target template video configured for the one or more target pictures, wherein the target template video includes a video playback effect; and acquiring a picture video by synthesizing the one or more target pictures and the target template video.

In some embodiments, the processor, when executing the at least one instruction, is caused to perform: identifying a type of one or more pictures in the browsing interface; acquiring a first parameter of the type; and acquiring the one or more target pictures by capturing the one or more pictures corresponding to the type in the case that the first parameter satisfies a first condition.

In some embodiments, the processor, when executing the at least one instruction, is caused to perform: identifying a type of one or more pictures in the browsing interface; acquiring a first parameter of the type; capturing the one or more pictures corresponding to the type in the case that the first parameter satisfies a first condition; and acquiring the one or more target pictures by processing the captured one or more pictures.

In some embodiments, the processor, when executing the at least one instruction, is caused to perform: acquiring first history data, wherein the first history data includes at least one of times of capturing, times of viewing, or times of storing in favorites with respect to the one or more pictures corresponding to the type; and determining the first parameter of the type based on the first history data.

In some embodiments, the processor, when executing the at least one instruction, is caused to perform: acquiring the first parameter of the type by counting the times of capturing, the times of viewing, and the times of storing in favorites in the first history data.

In some embodiments, the processor, when executing the at least one instruction, is caused to perform: acquiring the one or more target pictures by beautifying the captured one or more pictures; or, determining, by face recognition on the captured one or more pictures, pictures containing a same face in the captured one or more pictures as the one or more target pictures.

In some embodiments, the processor, when executing the at least one instruction, is caused to perform: determining, by face recognition on the captured one or more pictures, pictures containing the same face and satisfying a second condition as the one or more target pictures.

In some embodiments, the processor, when executing the at least one instruction, is caused to perform: acquiring a template video library, and a second parameter of each of template videos in the template video library; and determining the target template video based on a template video with the second parameter satisfying a third condition.

In some embodiments, the processor, when executing the at least one instruction, is caused to perform: acquiring second history data, wherein the second history data includes at least one of times of selecting, times of complete playback, or times of storing in favorites with respect to each of the template videos; and determining the second parameter of each of the template videos based on the second history data.

In some embodiments, the processor, when executing the at least one instruction, is caused to perform: acquiring the second parameter of each of the template videos by counting the times of selecting, the times of complete playback, and the times of storing in favorites with respect to each of the template videos in the second history data.

In some embodiments, the template video includes a transition effect parameter, wherein the transition effect parameter is configured to indicate a dynamic effect for picture switching.

In some embodiments, the processor, when executing the at least one instruction, is caused to perform: acquiring a plurality of video frames by framing the target template video; and acquiring the picture video by fusing the one or more target pictures into corresponding video frames.

In some embodiments, the processor, when executing the at least one instruction, is caused to perform: sorting the one or more target pictures based on a picture content of the one or more target pictures; and acquiring the picture video by fusing the one or more target pictures into the corresponding video frame in the sort order of the one or more target pictures.

In some embodiments, the processor, when executing the at least one instruction, is caused to perform: sorting the one or more target pictures in a chronological order in the case that each of the target pictures contains time information therein; or, sorting the one or more target pictures based on an action of a person in the case that each of the target pictures contains the person therein.

In some embodiments, the processor, when executing the at least one instruction, is caused to perform: displaying a completion notification for the picture video and a jump button; and jumping to a playback interface of the picture video in response to a trigger operation on the jump button.

In an exemplary embodiment, a non-transitory computer-readable storage medium including at least one instruction (such as a memory 804 including at least one instruction) is further provided. The at least one instruction may be executed by the processor 820 of the electronic device 800 to perform the method for synthesizing videos according to any one of the above embodiments.

In some embodiments, a storage medium storing at least one instruction therein is provided. The at least one instruction, when executed by a processor of an electronic device, causes the electronic device to perform:
- capturing one or more target pictures from a browsing interface of a client;
- acquiring a target template video configured for the one or more target pictures, wherein the target template video includes a video playback effect; and
- acquiring a picture video by synthesizing the one or more target pictures and the target template video.

In some embodiments, the at least one instruction in the storage medium, when executed by the processor of the electronic device, causes the electronic device to perform: identifying a type of one or more pictures in the browsing interface; acquiring a first parameter of the type; capturing the one or more pictures corresponding to the type in the case that the first parameter satisfies a first condition; and acquiring the one or more target pictures by processing the captured pictures.

In some embodiments, the at least one instruction in the storage medium, when executed by the processor of the electronic device, causes the electronic device to perform: acquiring first history data, wherein the first history data includes at least one of times of capturing, times of viewing, or times of storing in favorites with respect to the one or more pictures corresponding to the type; and determining the first parameter of the type based on the first history data.

In some embodiments, the at least one instruction in the storage medium, when executed by the processor of the electronic device, causes the electronic device to perform: acquiring the first parameter of the type by counting the times of capturing, the times of viewing, and the times of storing in favorites in the first history data.

In some embodiments, the at least one instruction in the storage medium, when executed by the processor of the electronic device, causes the electronic device to perform: acquiring the one or more target pictures by beautifying the captured one or more pictures; or, determining, by face recognition on the captured one or more pictures, pictures containing a same face in the captured one or more pictures as the one or more target pictures.

In some embodiments, the at least one instruction in the storage medium, when executed by the processor of the electronic device, causes the electronic device to perform: determining, by face recognition on the captured one or more pictures, pictures containing the same face and satisfying a second condition as the one or more target pictures.

In some embodiments, the at least one instruction in the storage medium, when executed by the processor of the electronic device, causes the electronic device to perform: acquiring a template video library, and a second parameter of each of template videos in the template video library; and determining the target template video based on a template video with the second parameter satisfying a third condition.

In some embodiments, the at least one instruction in the storage medium, when executed by the processor of the electronic device, causes the electronic device to perform: acquiring second history data, wherein the second history data includes at least one of times of selecting, times of complete playback, or times of storing in favorites with respect to each of the template videos; and determining the second parameter of each of the template videos based on the second history data.

In some embodiments, the at least one instruction in the storage medium, when executed by the processor of the electronic device, causes the electronic device to perform: acquiring the second parameter of each of the template videos by counting the times of selecting, the times of complete playback, and the times of storing in favorites with respect to each of the template videos in the second history data.

In some embodiments, the template video includes a transition effect parameter, wherein the transition effect parameter is configured to indicate a dynamic effect for picture switching.

In some embodiments, the at least one instruction in the storage medium, when executed by the processor of the electronic device, causes the electronic device to perform: acquiring a plurality of video frames by framing the target template video; and acquiring the picture video by fusing the one or more target pictures into corresponding video frames.

In some embodiments, the at least one instruction in the storage medium, when executed by the processor of the electronic device, causes the electronic device to perform: sorting the one or more target pictures based on a picture content of the one or more target pictures; and acquiring the picture video by fusing the one or more target pictures into the corresponding video frame in the sort order of the one or more target pictures.

In some embodiments, the at least one instruction in the storage medium, when executed by the processor of the electronic device, causes the electronic device to perform: sorting the one or more target pictures in a chronological order in the case that each of the target pictures contains time information therein; or, sorting the one or more target pictures based on an action of a person in the case that each of the target pictures contains the person therein.

In some embodiments, the at least one instruction in the storage medium, when executed by the processor of the electronic device, causes the electronic device to perform: displaying a completion notification for the picture video and a jump button; and jumping to a playback interface of the picture video in response to a trigger operation on the jump button.

For example, the non-transitory computer-readable storage medium may be a ROM, a random-access memory (RAM), a compact disc read-only memory (CD-ROM), a magnetic tape, a floppy disk, an optical data storage device, or the like.

In an exemplary embodiment, a computer program product is further provided. The computer program product includes at least one computer-executable program code, wherein the at least one computer-readable program code, when executed by the processor 820 of the electronic device 800, causes the electronic device 800 to perform the method for synthesizing videos according to any one of the above embodiments.

In an exemplary embodiment, a computer program product is further provided. The computer program product includes at least one computer-executable program code, wherein the at least one computer-executable program code, when executed by the processor 820 of the electronic device 800, causes the electronic device 800 to perform: capturing one or more target pictures from a browsing interface of a client; acquiring a target template video configured for the one or more target pictures, wherein the target template video includes a video playback effect; and acquiring a picture video by synthesizing the one or more target pictures and the target template video.

In some embodiments, the at least one program code may be stored in a storage medium of the electronic device 800. The storage medium may be a non-transitory computer-readable storage medium. For example, the non-transitory computer-readable storage medium may be a ROM, a RAM, a CD-ROM, a magnetic tape, a floppy disk, an optical data storage device, or the like.

Figure 8:
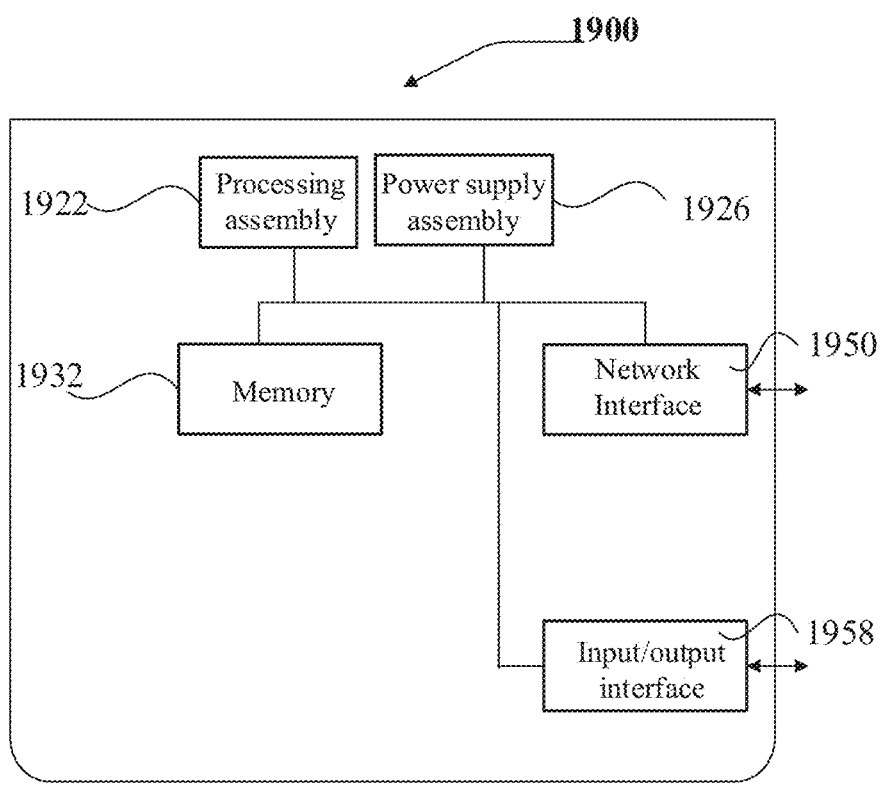
FIG. 8 is a block diagram of an electronic device for synthesizing videos according to an exemplary embodiment of the present disclosure.

FIG. 8 is a block diagram of an electronic device 1900 for synthesizing videos illustrated in the present disclosure. For example, the electronic device 1900 may be provided as a server.

Referring to FIG. 8, the electronic device 1900 includes: a processing assembly 1922, which further includes one or more processors; and a memory resource represented by a memory 1932 for storing at least one instruction (for example, an application program) executable by the processing assembly 1922. The application program stored in the memory 1932 may include one or more modules, each of which corresponds to a set of instructions. In addition, the processing assembly 1922, when executing the at least one instruction, is caused to perform the at least one instruction so as to perform the method for synthesizing videos according to any one of the above embodiments. The method for synthesizing videos includes: capturing one or more target pictures from a browsing interface of a client; acquiring a target template video configured for the one or more target pictures, wherein the target template video includes a video playback effect; and acquiring a picture video by synthesizing the one or more target pictures and the target template video.

The electronic device 1900 may further include: a power supply assembly 1926 configured to manage the power of the electronic device 1900, a wired or wireless network interface 1950 configured to connect the electronic device 1900 to a network, and an input/output (I/O) interface 1958. The electronic device 1900 may operate an operating system, such as WindowsServer™, MacOSX™, Unix™, Linux™, FreeBSD™, or the like, stored in the memory 1932.

Other embodiments of the present disclosure are readily conceivable to those skilled in the art from consideration of the specification and the practice of the present disclosure herein. The present disclosure is intended to cover any variations, uses, or adaptive changes of the present disclosure. These variations, uses, or adaptive changes follow the general principle of the present disclosure and include common knowledge or conventional technical means in the technical field, which are not disclosed in the present disclosure. The specification and embodiments are to be considered as exemplary only, and the true scope and spirit of the present disclosure are as indicated by the appended claims.

A1. A method for synthesizing videos, including:
  capturing one or more target pictures from a browsing interface of a user;
  acquiring a target video template configured for the one or more target pictures, wherein the target video template includes a video effect parameter; and
  acquiring a picture video by synthesizing the one or more target pictures and the target video template.

A2. The method according to A1, wherein capturing the one or more target pictures from the browsing interface of the user includes:
  identifying a scene type of a picture in the browsing interface;
  acquiring a first score value of the scene type;
  capturing pictures corresponding to the scene type in the case that the first score value satisfies a first preset threshold; and
  determining the captured one or more pictures as the target pictures, or acquiring the one or more target pictures by processing the captured one or more pictures.

A3. The method according to A2, wherein acquiring the first score value of the scene type includes:
  acquiring first history operation data of the user on pictures corresponding to the scene type, wherein the first history operation data includes times of capturing, times of viewing, and times of storing in favorites with respect to the user for the picture; and
  acquiring the first score value of the scene type by performing weighted summation on the first history operation data.

A4. The method according to A2, wherein acquiring the one or more target pictures by processing the captured one or more pictures includes:
  acquiring the one or more target pictures by beautifying the captured one or more pictures; or, determining, by face recognition on the captured one or more pictures, pictures containing a same face in the captured one or more pictures as the one or more target pictures; or, determining, by face recognition on the captured one or more pictures, pictures containing the same face and satisfying a second condition as the one or more target pictures.

A5. The method according to A1, wherein acquiring the target video template configured for the one or more target pictures includes:

acquiring a video template library, and a second score value of each of video templates in the video template library; and determining the target video template based on a video template with the second score value satisfying a second preset threshold.

A6. The method according to A5, wherein acquiring the second score value of each of the video templates in the video template library includes:

acquiring second history operation data of the user on each of the video templates in the video template library, wherein the second history operation data include times of selecting, times of complete playback, and times of storing in favorites with respect to the user for the video template; and acquiring the second score value of each of the video templates by performing weighted summation on the second history operation data.

A7. The method according to any one of A1 to A6, wherein the video effect parameter includes a transition effect parameter.

A8. The method according to any one of A1 to A6, wherein acquiring the picture video by synthesizing the one or more target pictures and the target video template includes:

acquiring a plurality of video frames by framing the target video template; and acquiring the picture video by inserting the one or more target pictures into corresponding video frames.

A9. An apparatus for synthesizing videos, including:

a first module, configured to capture one or more target pictures from a browsing interface of a user;

a second module, configured to acquire a target video template configured for the one or more target pictures, wherein the target video template includes a video effect parameter; and a third module, configured to acquire a picture video by synthesizing the one or more target pictures and the target video template.

A10. The apparatus according to A9, wherein the first module includes:

an identifying unit, configured to identify a scene type of one or more pictures in the browsing interface;

a first acquiring unit, configured to acquire a first score value of the scene type;

a capturing unit, configured to, capture the one or more pictures corresponding to the scene type in the case that the first score value satisfies a first preset threshold; and a first determining unit, configured to determine the captured one or more pictures as the one or more target pictures, or acquire the one or more target pictures by processing the captured one or more pictures.

A11. The apparatus according to A10, wherein the first acquiring unit is specifically configured to:

acquire first history operation data of the user on pictures corresponding to the scene type, wherein the first history operation data includes times of capturing, times of viewing, and times of storing in favorites with respect to the user for the picture; and acquire the first score value of the scene type by performing weighted summation on the first history operation data.

A12. The apparatus according to A10, wherein the first determining unit is specifically configured to:

acquire the one or more target pictures by beautifying the captured one or more pictures; or, determine, by face recognition on the captured one or more pictures, pictures containing a same face in the captured one or more pictures as the one or more target pictures; or, determine, by face recognition on the captured one or more pictures, pictures containing the same face and satisfying a second condition as the one or more target pictures.

A13. The apparatus according to A9, wherein the second module includes:

a second acquiring unit, configured to acquire a video template library, and a second score value of each of video templates in the video template library; and a second determining unit, configured to determine the target template video based on a video template with the second score value satisfying a second preset threshold.

A14. The apparatus according to A13, wherein the second acquiring unit is specifically configured to:

acquire second history operation data of the user on each of the video templates in the video template library, wherein the second history operation data includes times of selecting, times of complete playback, and times of storing in favorites with respect to the user for the video template; and acquire the second score value of each of the video templates by performing weighted summation on the second history operation data.

A15. The apparatus according to any one of A9 to A14, wherein the video effect parameter includes a transition effect parameter.

A16. The apparatus according to any one of A9 to A14, wherein the third module is specifically configured to:

acquire a plurality of video frames by framing the target video template; and acquire the picture video by inserting the one or more target pictures into corresponding video frames.

What is claimed is:

1. A method for synthesizing videos, performed by an electronic device, the method comprising:

capturing one or more target pictures from a browsing interface of a client;

acquiring a target template video configured for the one or more target pictures, wherein the target template video comprises a video playback effect; and acquiring a picture video by synthesizing the one or more target pictures and the target template video, wherein said acquiring the picture video by synthesizing the one or more target pictures and the target template video comprises:

acquiring a plurality of video frames by framing the target template video; and acquiring the picture video by fusing the one or more target pictures into corresponding video frames, wherein said acquiring the picture video by fusing the one or more target pictures into the corresponding video frames comprises:

sorting the one or more target pictures based on picture content of the one or more target pictures; and
acquiring the picture video by fusing the one or more target pictures into the corresponding video frames in a sort order of the one or more target pictures,
wherein said sorting the one or more target pictures based on the picture content of the one or more target pictures comprises:
sorting the one or more target pictures based on an action of a person in order to achieve continuity in actions of the person in the case that each of the one or more target pictures contains the person therein.

2. The method according to claim 1, wherein said capturing the one or more target pictures from the browsing interface of the client comprises:
identifying a type of one or more pictures in the browsing interface;
acquiring a first parameter of the type;
capturing the one or more pictures corresponding to the type in the case that the first parameter satisfies a first condition; and
acquiring the one or more target pictures by processing the captured one or more pictures.

3. The method according to claim 2, wherein said acquiring the first parameter of the type comprises:
acquiring first history data, wherein the first history data comprises at least one of times of capturing, times of viewing, or times of storing in favorites with respect to the one or more pictures corresponding to the type; and
determining the first parameter of the type based on the first history data.

4. The method according to claim 3, wherein said determining the first parameter of the type based on the first history data comprises:
acquiring the first parameter of the type by counting the times of capturing, the times of viewing, and the times of storing in favorites in the first history data.

5. The method according to claim 2, wherein said acquiring the one or more target pictures by processing the captured one or more pictures comprises:
acquiring the one or more target pictures by beautifying the captured one or more pictures; or,
determining, by face recognition on the captured one or more pictures, pictures containing a same face in the captured one or more pictures as the one or more target pictures.

6. The method according to claim 5, wherein said determining, by face recognition on the captured one or more pictures, the pictures containing a same face in the captured one or more pictures as the one or more target pictures comprises:
determining, by face recognition on the captured one or more pictures, pictures containing the same face and satisfying a second condition as the one or more target pictures.

7. The method according to claim 5, wherein said acquiring the one or more target pictures by beautifying the captured one or more pictures, comprises:
beautifying the captured one or more pictures in a first beautification mode in response to the captured one or more pictures containing a face; and
beautifying the captured one or more pictures in a second beautification mode in response to none of the captured one or more pictures containing a face, wherein the first beautification mode is face beautification, and the second beautification mode is brightness adjustment or contrast adjustment.

8. The method according to claim 1, wherein said capturing the one or more target pictures from the browsing interface of the client comprises:
identifying a type of one or more pictures in the browsing interface;
acquiring a first parameter of the type; and
acquiring the one or more target pictures by capturing the one or more pictures corresponding to the type in the case that the first parameter satisfies a first condition.

9. The method according to claim 1, wherein said acquiring the target template video configured for the one or more target pictures comprises:
acquiring a template video library, and a second parameter of each of template videos in the template video library; and
determining the target template video based on a template video with the second parameter satisfying a third condition.

10. The method according to claim 9, wherein said acquiring the second parameter of each of the template videos in the template video library comprises:
acquiring second history data, wherein the second history data comprises at least one of times of selecting, times of complete playback, or times of storing in favorites with respect to each of the template videos; and
determining the second parameter of each of the template videos based on the second history data.

11. The method according to claim 10, wherein said determining the second parameter of each of the template videos based on the second history data comprises:
acquiring the second parameter of each of the template videos by counting the times of selecting, the times of complete playback, and the times of storing in favorites with respect to each of the template videos in the second history data.

12. The method according to claim 1, wherein the target template video comprises a transition effect parameter, wherein the transition effect parameter is configured to indicate a dynamic effect for picture switching.

13. The method according to claim 1, further comprising:
displaying a completion notification for the picture video and a jump button; and
jumping to a playback interface of the picture video in response to a trigger operation on the jump button.

14. An electronic device for synthesizing videos, comprising:
a processor; and
a memory configured to store at least one instruction executable by the processor;
wherein the processor, when executing the at least one instruction, is caused to perform:
capturing one or more target pictures from a browsing interface of a client;
acquiring a target template video configured for the one or more target pictures, wherein the target template video comprises a video playback effect; and
acquiring a picture video by synthesizing the one or more target pictures and the target template video,
wherein said acquiring the picture video by synthesizing the one or more target pictures and the target template video comprises:
acquiring a plurality of video frames by framing the target template video; and
acquiring the picture video by fusing the one or more target pictures into corresponding video frames, wherein said acquiring the picture video by fusing the one or more target pictures into the corresponding video frames comprises:
  sorting the one or more target pictures based on picture content of the one or more target pictures; and
  acquiring the picture video by fusing the one or more target pictures into the corresponding video frames in a sort order of the one or more target pictures,
wherein said sorting the one or more target pictures based on the picture content of the one or more target pictures comprises:
  sorting the one or more target pictures based on an action of a person in order to achieve continuity in actions of the person in the case that each of the one or more target pictures contains the person therein.

15. The electronic device according to claim 14, wherein the processor, when executing the at least one instruction, is caused to perform:
  identifying a type of one or more pictures in the browsing interface;
  acquiring a first parameter of the type;
  capturing the one or more pictures corresponding to the type in the case that the first parameter satisfies a first condition; and
  acquiring the one or more target pictures by processing the captured one or more pictures.

16. The electronic device according to claim 15, wherein the processor, when executing the at least one instruction, is caused to perform:
  acquiring first history data, wherein the first history data comprises at least one of times of capturing, times of viewing, or times of storing in favorites with respect to the one or more pictures corresponding to the type; and
  determining the first parameter of the type based on the first history data.

17. The electronic device according to claim 16, wherein the processor, when executing the at least one instruction, is caused to perform:
  acquiring the first parameter of the type by counting the times of capturing, the times of viewing, and the times of storing in favorites in the first history data.

18. A non-transitory computer-readable storage medium storing at least one instruction therein, wherein the at least one instruction, when executed by a processor of an electronic device, causes the electronic device to perform:
  capturing one or more target pictures from a browsing interface of a client;
  acquiring a target template video configured for the one or more target pictures, wherein the target template video comprises a video playback effect; and
  acquiring a picture video by synthesizing the one or more target pictures and the target template video,
wherein said acquiring the picture video by synthesizing the one or more target pictures and the target template video comprises:
  acquiring a plurality of video frames by framing the target template video; and
  acquiring the picture video by fusing the one or more target pictures into corresponding video frames,
wherein said acquiring the picture video by fusing the one or more target pictures into the corresponding video frames comprises:
  sorting the one or more target pictures based on picture content of the one or more target pictures; and
  acquiring the picture video by fusing the one or more target pictures into the corresponding video frames in a sort order of the one or more target pictures,
wherein said sorting the one or more target pictures based on the picture content of the one or more target pictures comprises:
  sorting the one or more target pictures based on an action of a person in order to achieve continuity in actions of the person in the case that each of the one or more target pictures contains the person therein.

* * * * *